D. GROOMS.
TRANSMISSION GEARING.
APPLICATION FILED MAY 9, 1916.

1,222,395.

Patented Apr. 10, 1917.
2 SHEETS—SHEET 1.

Witnesses
Inventor
D. Grooms,
By Victor J. Evans
Attorney

D. GROOMS.
TRANSMISSION GEARING.
APPLICATION FILED MAY 9, 1916.

1,222,395.

Patented Apr. 10, 1917.
2 SHEETS—SHEET 2.

Witnesses

Inventor
D. Grooms,
By Victor J. Evans
Attorney

UNITED STATES PATENT OFFICE.

DENVER GROOMS, OF MARSHALL, MICHIGAN.

TRANSMISSION-GEARING.

1,222,395.  Specification of Letters Patent.  Patented Apr. 10, 1917.

Application filed May 9, 1916. Serial No. 96,381.

*To all whom it may concern:*

Be it known that I, DENVER GROOMS, a citizen of the United States, residing at Marshall, in the county of Calhoun and State of Michigan, have invented new and useful Improvements in Transmission-Gearing, of which the following is a specification.

This invention relates to transmission gearing and is especially adapted for use in automobile practice to change the ratio of speed between the engine shaft and the drive shaft which extends to the rear differential gearing.

One of the principal objects of the invention is to greatly simplify the transmission gearing of a motor vehicle by utilizing only two gears to produce all the forward speeds necessary in the operation of the vehicle, thereby avoiding the shifting of a large number of gears and requiring only a change in the relationship of the two gears which produce all of the required forward speeds.

In connection with the transmission gearing of this invention, I also employ simple means for reversing the direction of rotation of the driving shaft.

With the above and other objects in view, the invention consists in the novel construction, combination and arrangement of parts, as herein described, illustrated and claimed.

In the accompanying drawings:—

Figure 1:
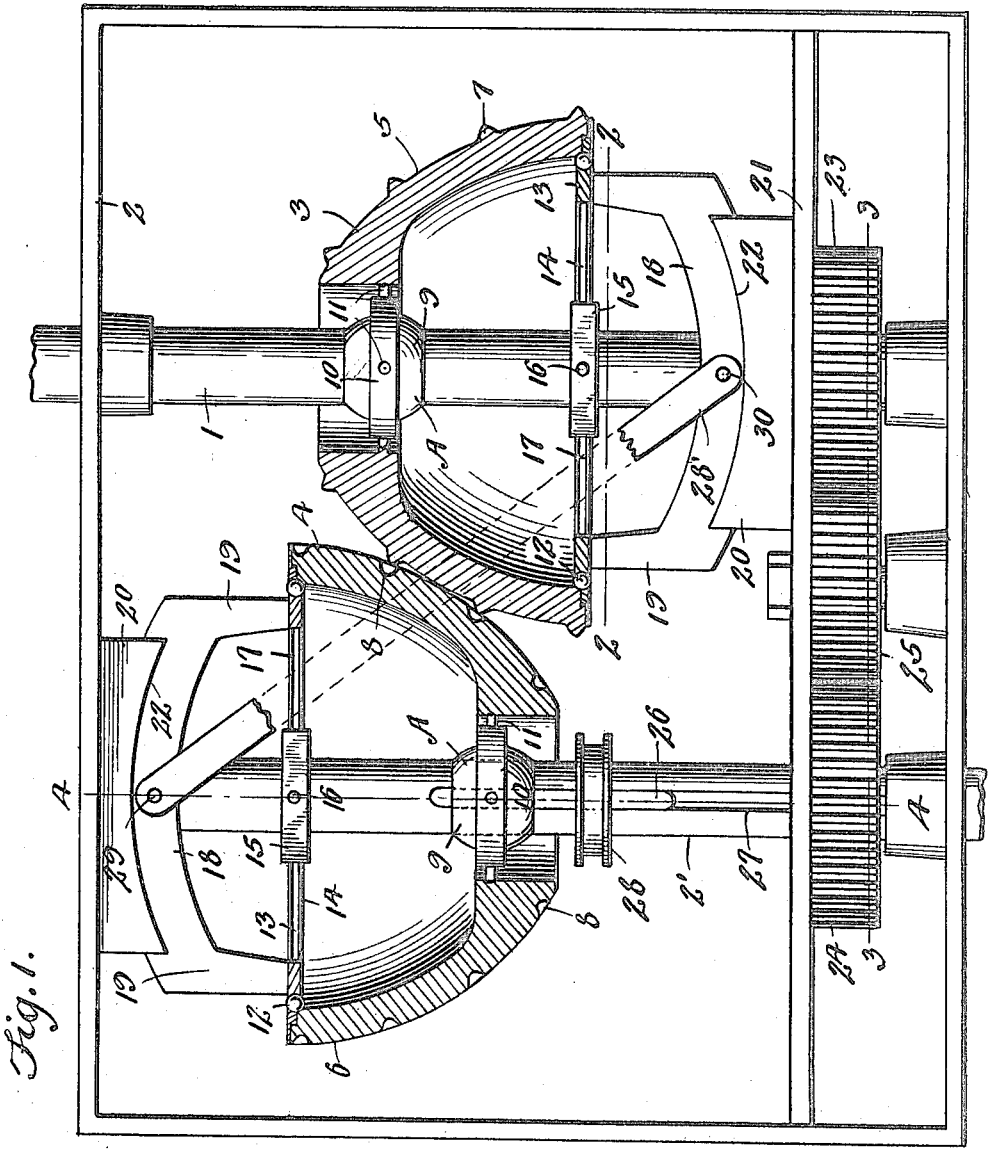
Figure 1 is a view partly in plan and partly in section of the transmission gearing of this invention, showing also the inclosing casing.

Referring to the drawings 1 designates the driving shaft of the transmission mechanism hereinafter particularly described, said shaft 1 ordinarily carrying the clutch by means of which said shaft is connected to the engine shaft in order that the latter may impart rotary motion to the shaft 1 which extends into the casing 2 of the transmission gearing and is mounted in suitable bearings therein.

Parallel to the shaft 1 is the driven shaft 2' of the transmission gearing, the shaft 2 preferably extending rearwardly to the differential gearing on the rear axle in accordance with the present automobile practice. The bearings for the shafts 1 and 2' are fixed so that there is no relative lateral movement between the shafts 1 and 2', both of which are, however, free to revolve.

Mounted on the shaft 1 is a driving gear 3, and mounted on the shaft 2' is another gear 4. Each of the gears 3 and 4 is generally hemispherical in shape, said gears having convex outer faces 5 and 6 adapted to roll in contact with each other when shifting from one speed to another. One of said gears is provided on its curvilinear outer surface with several concentric series of projecting teeth 7 while the corresponding face of the other gear is formed with corresponding series of sockets 8 to receive the teeth 7 just referred to. Furthermore, the gears 3 and 4 are disposed reversely to each other as regards their larger and smaller ends thus providing for a wide variation in the relative speeds of the two gears.

Each of the gears 3 and 4 is mounted on its respective shaft by means of a universal joint designated generally at A and comprising a ball member 9 which is keyed to its shaft, and an intermediate ring member 10 which is pivoted to the ball member and to the gear member, the gear member pivots 11 being arranged at right angles to the ball member pivots 11. The construction described and shown enables each of the gears 3 and 4 to rock on its respective shaft while in driving or driven engagement therewith.

Figure 2:
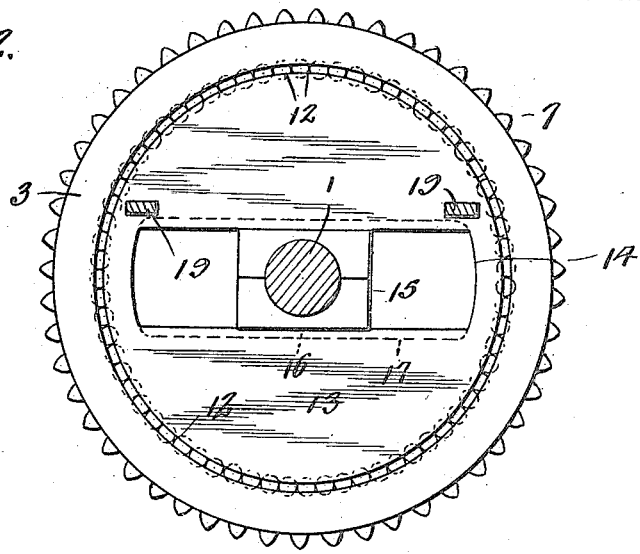
Fig. 2 is a partial vertical cross section on the line 2—2 of Fig. 1.
Figure 3:
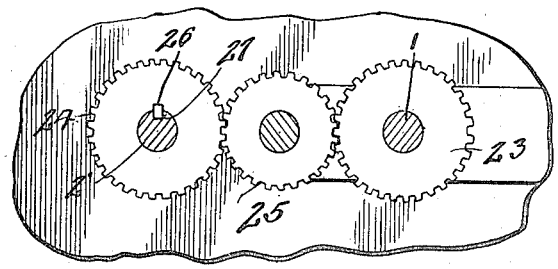
Fig. 3 is a vertical cross section on the line 3—3 of Fig. 1.
Figure 4:
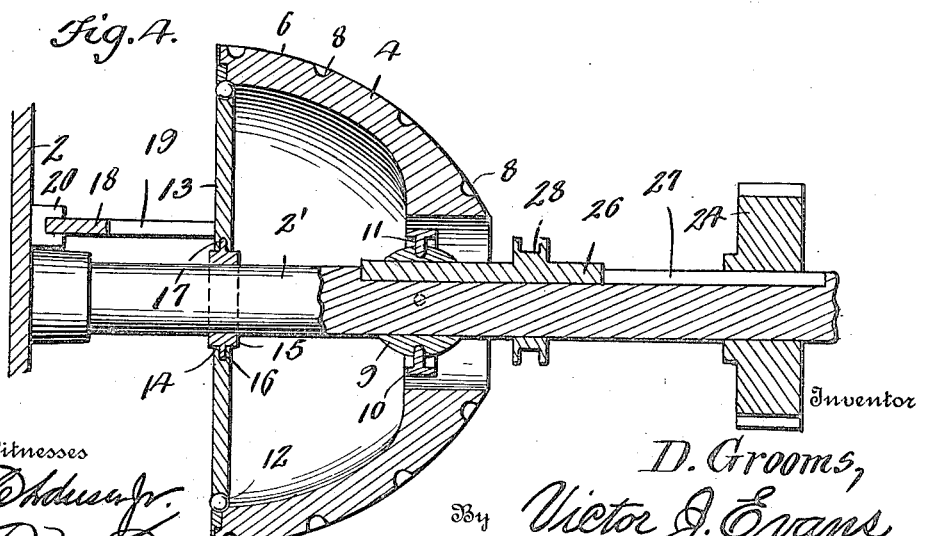
Fig. 4 is a section on the line 4—4 of Fig. 1.

Each of the gears 3 and 4 is also of hollow formation as shown and formed in the inner wall of the larger end thereof with a ball race as shown to receive an annular series of anti-friction balls 12 which travel in a race way in a disk-shaped supporting member 13, the latter being best illustrated in Fig. 2 wherein it is shown as formed with a diametrically extending guide way 14 to receive a bearing 15 for the shaft 1 or 2' as the case may be. The bearing 15 is provided with diametrically opposite trunnions 16 which slide back and forth in grooves 17 at opposite sides of the slot 14 and formed in the supporting member 13. Connected to the supporting member 13 is a runner 18 having two diametrically opposite arms 19 which are fastened to the supporting member 13. The portion of the runner 18 which connects the arms 19 is of arcuate formation, being described on a curve of which the center of the universal joint A is the center. The runner 18 works in conjunction with a stationary guide 20 either fastened to the casing 2 or to an arm or bracket 21 within said casing. The guide 20 has a curvilinear marginal portion 22 which is described on the same arc as the connecting portion of the runner 18.

The reversing gearing comprises a spur gear 23 fast on the driving shaft 1, another spur gear 24 normally loose on the driven shaft 2', and an intermediate idler gear 25 interposed between and meshing with the gears 23 and 24. 26 designates a key slidable in a key way 27 in the driven shaft 2' and provided with a collar 28 surrounding the shaft 2' and adapted to be shifted back and forth by means of a forked lever. The key 26 is of sufficient length to enter a key way in the gear 24 and also to enter a key way in the inner member 9 of the universal joint A which connects the gear 4 with the driven shaft 2'. By means of said key 26, therefore, either the gear 4 may be locked to the shaft 2' to rotate therewith or by shifting said key toward the gear 24, the latter may be locked to the shaft 2' while the gear 4 is released.

When the parts are in the position illustrated in Fig. 1 the drive is from the shaft 1 through the gear 3 to the gear 4 and the shaft 2' back to the differential gearing of the machine. When the key 26 is shifted into engagement with the gear 24 and out of engagement with the gear 4, the drive is then from the shaft 1 to the gear 23 and through the idler 25 and gear 24 to the shaft 2' and thence rearwardly to the differential, thus reversing the direction of rotation of the driving wheels of the machine.

In order that the gears 3 and 4 may be caused to rock equally, an equalizing or connecting yoke 28 is pivotally connected at 29 to one of the runners 18 and pivotally connected at 30 to the other runner 18. Any suitable manually controlled means may be employed for shifting either one of the gears 3 and 4 or shifting the yoke 28' and thereby imparting the necessary shifting movement to said gears 3 and 4. The teeth and sockets of said hemispherical gears are so proportioned and numbered and relatively arranged that ample clearance is provided between the several sets of teeth and sockets in order that one set of teeth will be rolled out of driving engagement with the sockets of the other gear before the succeeding series of teeth enter the respective series of sockets in the other gear. By moving the key 26 to a central or universal position, all driving connection is broken between the driving shaft 1 and the driven shaft 2', enabling the vehicle to be brought to a standstill.

I claim:—

1. In transmission gearing, the combination of a driving shaft and a driven shaft both mounted in fixed bearings and arranged in parallel and spaced relation to each other, reversely disposed gears each substantially hemispherical in shape and one of which is permanently keyed to its shaft while the other is adapted to be connected to and disconnected from its shaft, one of said gears being formed with several series of projecting teeth, the other gear being provided with corresponding series of sockets to receive said teeth, and a yoke operatively connecting said gears to cause the outer faces thereof to roll in contact with each other in shifting from one speed to another.

2. In transmission gearing, the combination of a driving shaft and a driven shaft both mounted in fixed bearings and arranged in parallel and spaced relation to each other, reversely disposed gears each substantially hemispherical in shape and one of which is permanently keyed to its shaft while the other is adapted to be connected to and disconnected from its shaft, one of said gears being formed with several series of projecting teeth, the other gear being provided with corresponding series of sockets to receive said teeth, a yoke operatively connecting said gears to cause the outer faces thereof to roll in contact with each other in shifting from one speed to another, and supporting bearings for the larger ends of said gears.

3. In transmission gearing, the combination of a driving shaft and a driven shaft both mounted in fixed bearings and arranged in parallel and spaced relation to each other, reversely disposed gears each substantially hemispherical in shape and one of which is permanently keyed to its shaft while the other is adapted to be connected to and disconnected from its shaft, one of said gears being formed with several series of projecting teeth, the other gear being provided with corresponding series of sockets to receive said teeth, a yoke operatively connecting said gears to cause the outer faces thereof to roll in contact with each other in shifting from one speed to another, supporting bearings for the larger ends of said gears, and means for guiding said gears in their rocking relation to the respective shafts.

4. In transmission gearing, the combination of a driving shaft and a driven shaft both mounted in fixed bearings and arranged in parallel and spaced relation to each other, reversely disposed gears each substantially hemispherical in shape and one of which is permanently keyed to its shaft while the other is adapted to be connected to and disconnected from its shaft, one of said gears being formed with several series of projecting teeth, the other gear being provided with corresponding series of sockets to receive said teeth, a yoke operatively connecting said gears to cause the outer faces thereof to roll in contact with each other in shifting from one speed to another, a reversing gear fast on the driving shaft, another reversing gear normally loose on the driven shaft, an idler gear between said reversing gears, and a key shiftable lengthwise of the driven shaft to engage either the driven speed gear or the reversing gear thereon.

In testimony whereof I affix my signature.

DENVER GROOMS.

Copies of this patent may be obtained for five cents each, by addressing the "Commissioner of Patents, Washington, D. C."